3,098,228
NAVIGATION SYSTEM
William W. Medlinski, Paterson, and Morey L. Hodgman, Westwood, N.J., assignors to The Bendix Corporation, a corporation of Delaware
Filed Sept. 5, 1958, Ser. No. 759,170
30 Claims. (Cl. 343—107)

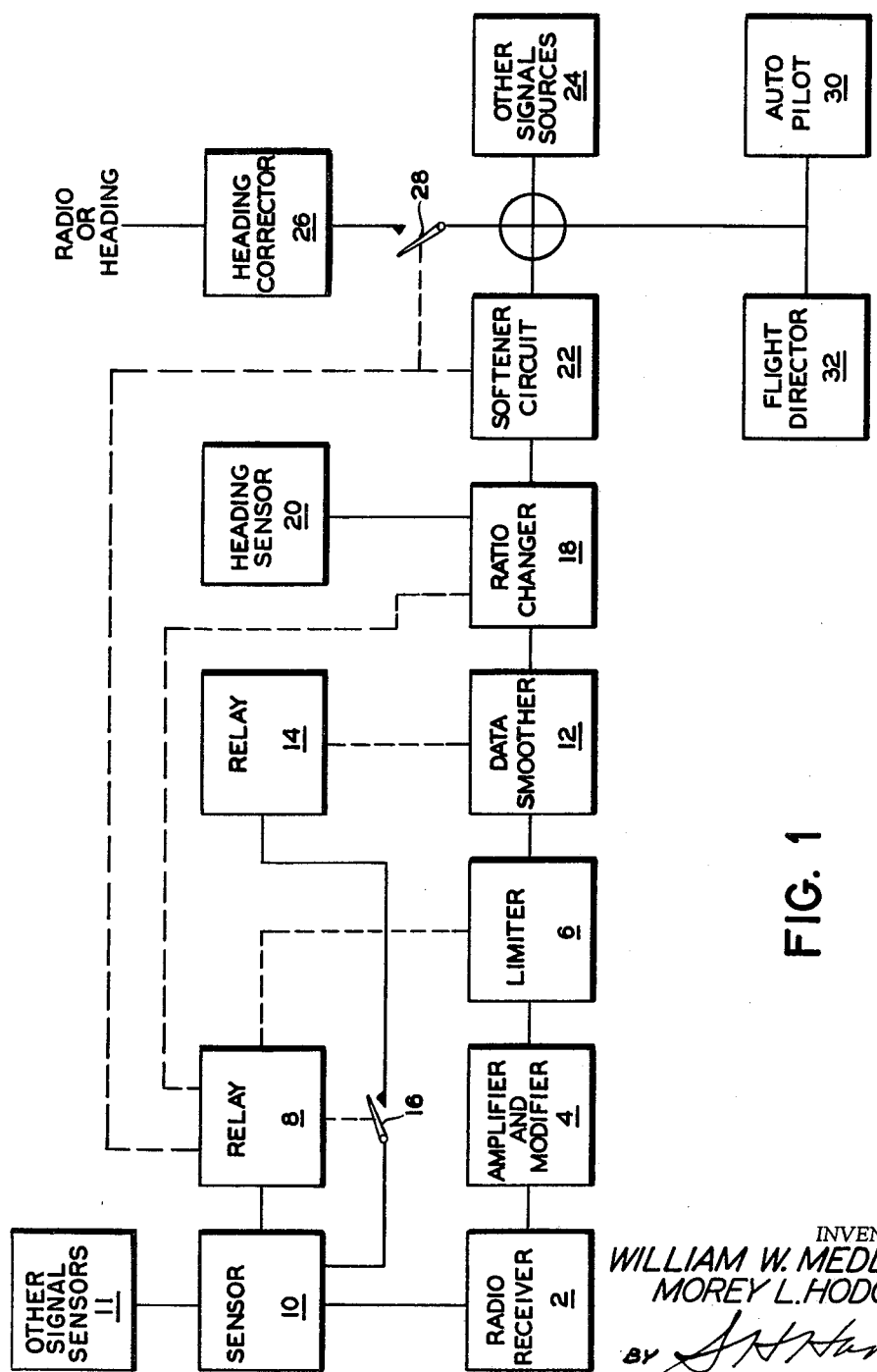

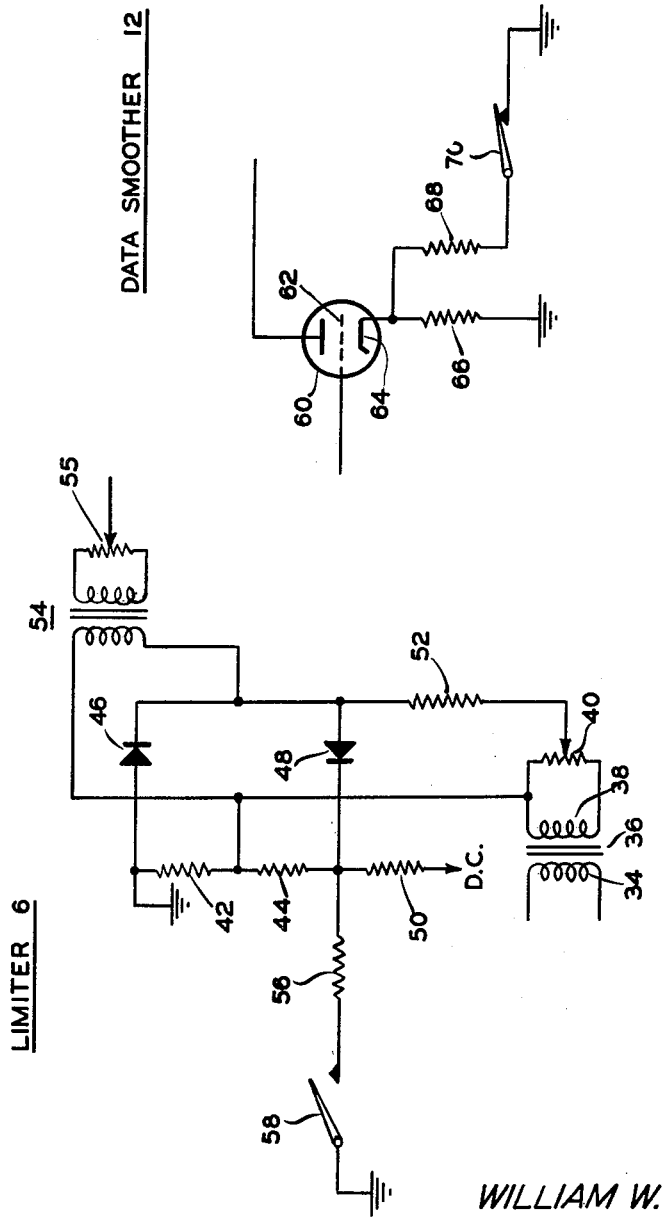

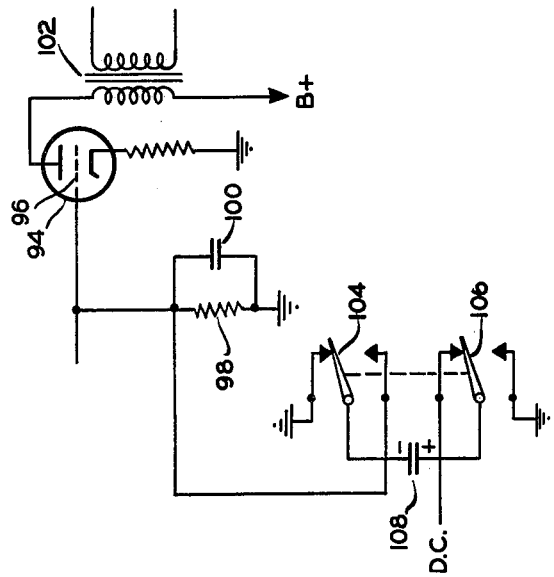
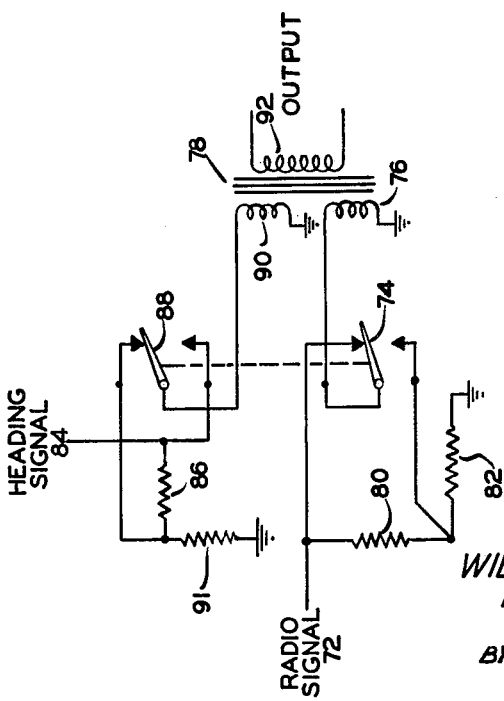

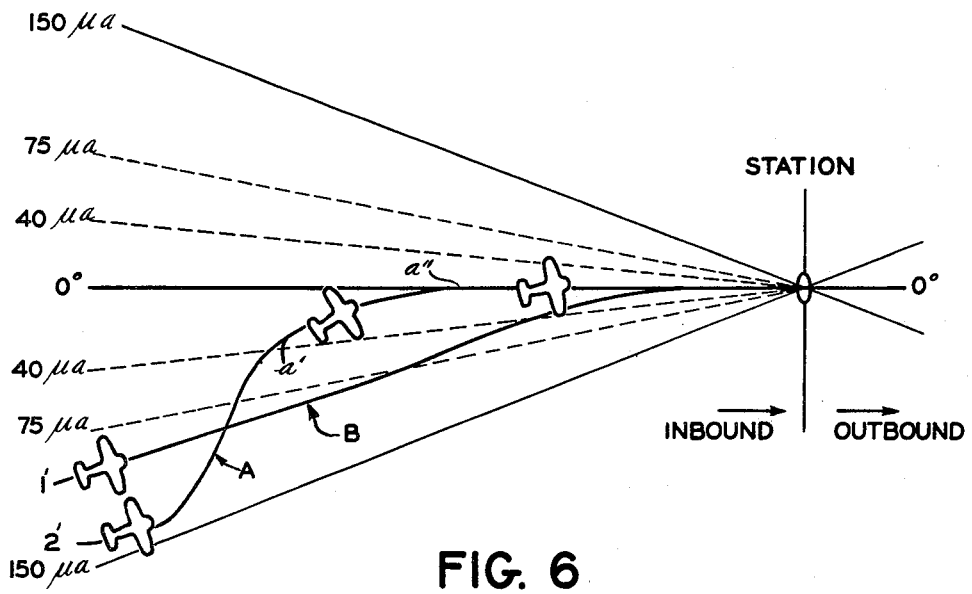
FIG. 6
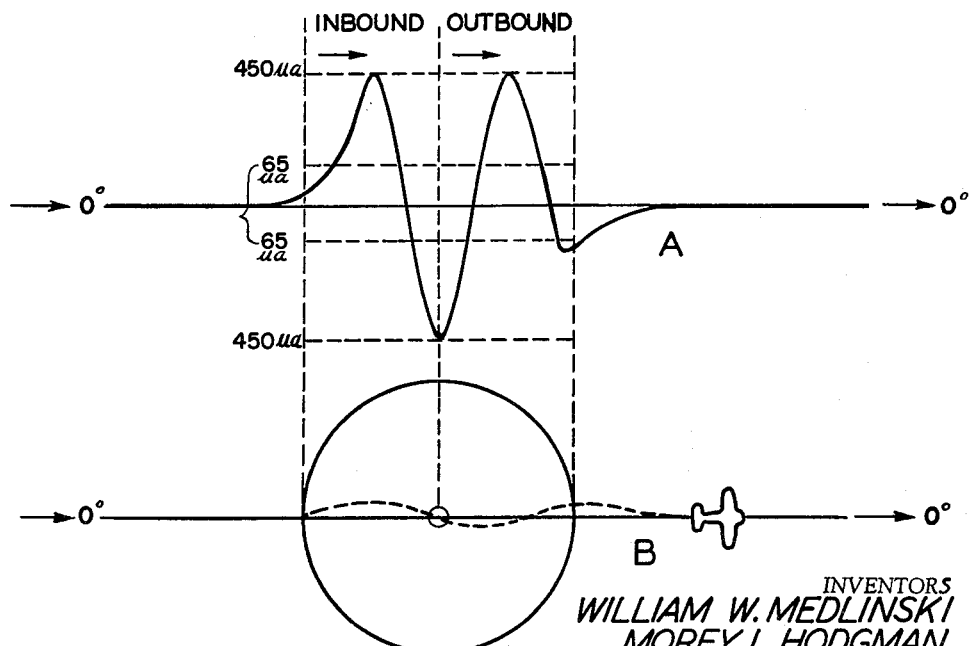
FIG. 7
INVENTORS
WILLIAM W. MEDLINSKI
MOREY L. HODGMAN
BY 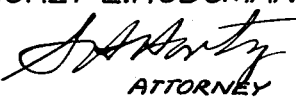
ATTORNEY United States Patent Office 3,098,228
Patented July 16, 1963

The invention relates to navigation systems and more particularly to navigation systems responsive to radio beams for guiding aircraft along the beam.

One object of the present invention is to provide a navigation system for automatically guiding a craft to intercept, capture and track a radio beam.

Another object of the invention is to guide the craft in a rapid approach to the beam upon engagement of the radio equipment at a substantial distance from the beam and then guide the craft to approach the beam gradually and thereafter track the beam.

Another object of the invention is to compensate for wind forces on the craft as the craft approaches and tracks the beam.

A further object is to avoid transients by automatically rendering the system less sensitive to large signal amplitudes caused by irregularities in the beam and particularly in the cone of confusion over the transmitter station.

The invention contemplates a navigation system for guiding a craft to capture and track a radio beam, comprising radio means for providing signals corresponding to the displacement of the craft from the beam, direction responsive means for providing signals corresponding to the heading of the craft relative to the direction of the beam, means responsive to the signals for guiding the craft, and means responsive to the displacement signals for changing the ratio of the signals relative to one another.

The amplitude of the heading signal may be increased and the amplitude of the displacement signal may be decreased or the amplitude of only one of the signals may be changed relative to the other to obtain the desired result. With this arrangement, when the craft is a substantial distance from the beam and the radio equipment is engaged the craft rapidly approaches the beam at a substantially large angle until the craft comes within a predetermined distance of the beam, then the angle of approach decreases gradually and the craft captures the beam and thereafter tracks the beam.

Wind can be compensated for by washing out the heading signal or by integrating the displacement signal or by Doppler Radar signals.

Transients may be avoided by using a data smoother having two time constants and controlled by the radio displacement signals to render the system less sensitive to large signal amplitudes than to small signal amplitudes. Abrupt changes in amplitude may be caused by irregularities in the beam and particularly in the cone of confusion over the transmitter station.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

In the drawings, FIGURE 1 is a block diagram showing a navigation system constructed according to the invention;

FIGURE 2 is a schematic showing the limiter of FIGURE 1;

FIGURE 3 is a schematic showing a portion of the data smoother of FIGURE 1;

FIGURE 4 is a schematic showing the ratio changer of FIGURE 1;

FIGURE 5 is a schematic showing the softener circuit of FIGURE 1;

FIGURE 6 is a diagram showing approaches of a craft in capturing and tracking the beam with and without the novel navigation system; and FIGURE 7 A and B are diagrams showing signal amplitude in the cone of confusion and the path of the craft through the cone of confusion using the novel navigation system.

The novel navigation system constructed according to the invention and shown in FIGURE 1 comprises a radio receiver 2 which receives signals from a radio transmitting station and provides direct current signals corresponding in polarity and amplitude to the direction and displacement of the craft from the radio beam. The direct current signals from the radio receiver are amplified and modulated by an amplifier and modifier 4.

The modulated signals from amplifier and modifier 4 are applied to a limiter 6 which is adjusted automatically for two operating limits in accordance with the amplitude of the radio signal for first intercepting the beam at a higher limit and then tracking the beam at a lower limit. A relay 8 operated by a sensor 10 connected to radio receiver 2 adjusts the operating limits for the intercept and tracking modes. Relay 8 is a self-locking relay and operates when the radio signal decreases to a predetermined amplitude and remains operable, even though the radio signal subsequently becomes greater than the predetermined amplitude, until the system is disengaged.

Sensor 10 may be controlled by other signal sources 11 in addition to signals from radio receiver 2, such as distance from the transmitter station, velocity of the craft, and beam rate, in any combination, depending on the type of aircraft on which the navigation system is used. On aircraft whose cruise speed does not substantially vary when flying a radio beam, sensor 10 may be actuated by beam displacement only. If the cruise speed of the aircraft varies substantially when flying a radio beam and it is desirable to minimize bracketing at all distances from the transmitter within the aircraft's maneuvering limits, then sensor 10 should be controlled by distance signals as well as beam displacement signals. If the cruise speed of the aircraft varies substantially when flying a radio beam then sensor 10 should be controlled by airspeed, or preferably ground speed, in addition to beam displacement. If the cruise speed of the aircraft is substantially constant when flying a radio beam and bracketing must be minimized at all distances from the transmitter within the aircraft's maneuvering limits, then sensor 10 should be controlled by signals corresponding to rate of displacement of the craft from the beam as well as beam displacement signals.

The limited signal from limiter 6 is fed to a data smoother or lag circuit 12 which modifies the input exponentially and has two time constants adjusted automatically by a relay 14 connected through a contact 16 of relay 8 to sensor 10. Relay 14 operates only in the tracking mode after relay 8 closes contact 16 and preferably at a larger radio signal amplitude than is required to operate relay 8. With this arrangement data smoother 12 is adjusted to one or the other of its time constants in accordance with the amplitude of the radio signals to avoid transients caused by sudden changes in amplitude of the radio signal. It will be observed that limiter 6 is connected in the circuit before data smoother 12 to first limit the amplitude of the signals before applying the signals to the data smoother. With this arrangement the lower time constant of the data smoother can be made quite low without sacrificing signal filtering and this limits the phase shift of the signals and results in more stable tracking of irregular beams and tight tracking of regular beams. This arrangement also limits maximum rate of change of craft attitude well within passenger comfort.

A ratio changer 18 receives and adds algebraically the output of data smoother 12 and a signal corresponding to heading of the craft relative to the direction of the beam from a heading sensor 20. The ratio of the signal amplitudes may be changed by relay 8 in accordance with the amplitude of the radio signal by increasing the amplitude of the heading signal relative to the radio signal and by reducing the amplitude of the radio signal relative to the heading signal, or by changing the amplitude of only one of the signals relative to the other.

The combined heading and radio signals from the ratio changer are applied to a softener circuit 22 which may be made to conduct exponentially during switching operations by relay 8 to avoid transient responses. The signals from softener circuit 22 are combined algebraically with other signals from sources 24, such as rate of turn, attitude or any other signals desired for controlling operation of the craft, and with signals from a heading corrector 26 which receives either radio or heading signals or Doppler Radar signals or combinations of these signals to correct for wind forces on the craft.

The heading corrector may be an integrating or washout circuit and is connected through a contact 28 of relay 8 to the signal chain so that the heading corrector is effective only in the capturing and tracking modes after relay 8 is actuated, that is, after the amplitude of the radio signal has decreased to the predetermined amplitude. The signal sum from softener circuit 22, other signal sources 24 and heading corrector 26 may be applied to aircraft guiding means, such as an autopilot 30 or a flight director 32, to guide the craft automatically or manually to intercept, capture and track the radio beam.

If the ratio changer is connected in the radio signal circuit between amplifier and modifier 4 and limiter 6 and the change in ratio between the heading signal and the radio signal is made by decreasing the amplitude of the radio signal only, then data smoother 12 acts as a softener during the switching operation to avoid transients and softener circuit 22 is not necessary.

In FIGURE 6 the path of a craft 2' using a navigation system constructed according to the present invention is shown at A. In the example shown, the radio is engaged at a point where the radio signal is between 75 and 150 microamperes and the craft turns from its present heading until the radio signal and heading signal substantially balance one another and then the craft approaches the beam at substantially a 45° angle until the radio signal is reduced to approximately 75 microamperes, whereupon the radio signal decreases below the limiting voltage of limiter 6 and the heading signal predominates. The craft again changes course until the radio signal is approximately 40 microamperes, at which time the craft approaches the beam at approximately a 30° angle and relay 8 operates and changes the ratio of heading signal and radio signal. The craft then continues to change course as shown at a' and gradually approaches the radio beam center and thereafter tracks beam center as shown at a".

The rapid approach of the craft 2' to the beam along a path A using a navigation system according to the present invention is in contrast to the slow approach of a craft 1' along a path B using a conventional navigation system as shown in FIGURE 6. The radio of the conventional navigation system is engaged as before at a point where the radio signal is between 75 and 150 microamperes and the craft slowly approaches the beam along a path B at a relatively small angle until it reaches the beam. This approach is undesireable because rapid beam capture is necessary, especially during Instrument Flight Rules conditions when traffic is controlled along specific routes.

In FIGURE 2 is shown a schematic diagram of limiter 6 which receives the modulated radio signal from amplifier and modifier 4 across primary winding 34 of a transformer 36 having its secondary winding 38 connected across a potentiometer 40 for adjusting the signal amplitude. The limiter includes a pair of resistors 42, 44 connected to a pair of diodes 46, 48 and through a resistor 50 to a direct current biasing source. The signal from potentiometer 40 is applied through a resistor 52 to the limiting circuit just described and the output appears across a transformer 54 and potentiometer 55 and is applied to data smoother 12. One limit of operation is obtained when resistors 42 and 44 are connected to the direct current source through resistor 50 and another limit of operation is obtained when resistors 42 and 44 are connected to ground through a resistor 56 by closing relay contact 58 upon energization of relay 8, when the radio signal has decreased to a predetermined amplitude.

FIGURE 3 shows a schematic diagram of the preamplifier portion of data smoother 12 which comprises a vacuum tube 60 having a grid 62 receiving the signal from potentiometer 55 of limiter 6. The cathode 64 of the tube is connected to ground through resistor 66 and through resistor 68 and relay contact 70 to provide the data smoother with a higher time constant. When the radio signal increases to a predetermined value, for example 65 microamperes, relay 14 opens contact 70 so that the cathode is connected to ground through resistor 66 only to provide a higher time constant substantially twice that of the low time constant for the data smoother. The higher time constant of the data smoother should be great enough to adequately attenuate cone of confusion signals, yet low enough for stability when recapturing the beam from beam displacements greater than is required to operate relay 14. As explained above, relay 14 operates only in the tracking mode after relay 8 closes contact 16 in FIGURE 1.

By providing data smoother 12 with two time constants and by controlling the time constants by operating relay 14 in response to the amplitude of the radio signal the craft will not respond to abnormal irregularities or abrupt changes in the radio beam, particularly those encountered in the cone of confusion over the transmitter station. As shown in FIGURE 7A, as the craft passes through the cone of confusion the amplitude of the radio signal varies abruptly and if the craft were not equipped with data smoother 12 having two time constants, the craft would follow the dotted line path through the cone of confusion, as shown in FIGURES 7B. However, as shown in FIGURE 7A, when the amplitude of the radio signal exceeds 65 microamperes relay 14 operates and changes the time constant of data smoother 12 so that the craft is less sensitive to such changes in the radio signal and follows the solid line path through the cone of confusion as shown in FIGURE 7B.

The attenuation of limiter 6 and data smoother 12 using the faster time constant of the data smoother is adequate for normal beam tracking, but insufficient when passing through the cone of confusion because a persistent output to automatic pilot 30 or flight director 32 results in an unsatisfactory change in heading of the craft. For this reason, the data smoother is provided with a slower time constant operable when the beam error exceeds 65 microamperes and limiter 6 is connected in the circuit before data smoother 12.

In some instances it might be desirable to combine the present system for attenuating radio signals in the cone of confusion with the To-From arrangements now in use wherein the To-From flag sensor disconnects the radio signals from the navigation system in the cone of confusion upon actuation of the To-From flag. Under these circumstances the present system would attenuate radio signals above 65 microamperes until the To-From flag was actuated to disconnect the radio signals from the navigation system. This is a decided improvement over the systems now in use where the heading of the craft is changed substantially from its proper course by irregularities in the beam in the cone of confusion before the To-From flag sensor disconnects the radio signals from the system.

FIGURE 4 shows a diagram of ratio changer 18 for increasing the amplitude of the heading signal and decreasing the amplitude of the radio signal. The radio signal from data smoother 12 is applied to input 72 and through relay contact 74 of relay 8 to one primary winding 76 of a transformer 78. Resistors 80 and 82 provide a return path to ground. The heading signal is applied to input 84 and through resistor 86 and relay contact 88 to primary winding 90 of transformer 78. Resistor 91 provides a return path to ground. The signals are summed by transformer 78 and the signal sum appears across secondary winding 92 of the transformer and is applied to softener circuit 22.

When the radio signal decreases to the predetermined value, shown in FIGURE 6 as approximately 40 microamperes, relay 8 operates contacts 74 and 88 to change the ratio of the amplitude of the radio signal to the heading signal. Input 72 receiving the radio signal then is connected through resistor 80 and contact 74 to primary winding 76 of transformer 78. The heading signal is applied directly through contact 88 to primary winding 90 of transformer 78.

While the arrangement shown and described increases the amplitude of the heading signal and decreases the amplitude of the radio signal, it should be understood that to change the signal ratio only one of the signal amplitudes need be changed relative to the other to accomplish the same result, that is, the amplitude of the heading signal may be increased while the amplitude of the radio signal remains constant or the amplitude of the radio signal may be decreased while the amplitude of the heading signal remains constant. Only one contact 74 or 88 of relay 8 need be used under these circumstances.

Softener circuit 22 is shown schematically in FIGURE 5 and comprises a vacuum tube 94 having a grid 96 connected through a biasing resistor 98 and condenser 100 in parallel to ground. The signal from ratio changer 18 is applied to grid 96 and the output appears across transformer 102. Contacts 104 and 106 of relay 8 connect a condenser 108 to a direct current source to change the condenser. When the radio signal decreases to the predetermined amplitude relay 8 operates contacts 104 and 106 to disconnect condenser 108 from the direct current source and to connect condenser 108 in parallel with biasing resistor 98 and the condenser 100. The condenser slowly discharges and changes the gain of tube 94 exponentially to soften the effects of switching to a new signal ratio in ratio changer 18 for guiding the craft on a new course.

The navigation system described herein after engagement solves a complete beam navigation problem by compensating for cross winds, attenuating normal beam fluctuations and automatically attenuating the spurious cone of confusion signals without further attention on the part of the pilot. The navigation system may be used with an automatic pilot to automatically guide the craft to intercept, capture and track the radio beam or it may be used with a flight director to enable the human pilot to manually guide the craft to intercept, capture and track the beam. The navigation system has two modes of operation, the intercept mode which provides rapid closure to beam center, and the tracking mode which provides stable tracking of beam center, and the navigation system automatically switches from one mode to the other. The approach to the beam, when the radio equipment is engaged at a substantial distance from the beam, is made at a relatively large angle so that the craft rapidly approaches the beam. When the craft is within a relatively short distance of beam center the craft is guided to approach beam center more gradually and track beam center. The navigation system compensates for wind forces on the craft when the craft closely approaches and tracks the beam. Transients are avoided by automatically rendering the system less sensitive to large signal amplitudes caused by irregularities in the beam and particularly in the cone of confusion over the transmitter station.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A navigation system for guiding a craft to intercept, capture, and track a radio beam, comprising radio means for providing signals corresponding to the displacement of the craft from the beam, a data smoother receiving the displacement signals and having means for varying its time constant, direction responsive means for providing signals corresponding to the heading of the craft relative to the direction of the beam, means connected to the data smoother and to the heading responsive means and responsive to the signals for guiding the craft, and means responsive to the displacement signals for changing the time constant of the data smoother when the displacement signals attain a predetermined amplitude.

2. A navigation system for guiding a craft to intercept, capture, and track a radio beam, comprising radio means for providing signals corresponding to the displacement of the craft from the beam, a data smoother receiving the displacement signals and having means for changing its time constant, direction responsive means for providing signals corresponding to the heading of the craft relative to the direction of the beam, means receiving the displacement signals from the data smoother and the heading signals from the direction responsive means for guiding the craft, means for changing the ratio of the displacement and heading signals relative to one another, and means responsive to the displacement signals for operating the time constant changing means of the data smoother and for operating the ratio changer when the displacement signals attain predetermined values.

3. A navigation system for guiding a craft to intercept, capture, and track a radio beam, comprising radio means for providing signals corresponding to the displacement of the craft from the beam, a limiter receiving the displacement signals and limiting the amplitude of the signals and having means for changing its limiting amplitude, a data smoother connected to the limiter and receiving the limited displacement signals and having means for changing its time constant, direction responsive means for providing signals corresponding to the heading of the craft relative to the direction of the beam, means receiving the displacement signals from the data smoother and the heading signals from the direction responsive means for guiding the craft, and means responsive to the displacement signals for operating the limiting amplitude changing means of the limiter and for operating the time constant changing means of the data smoother when the displacement signals attain predetermined values.

4. A navigation system for guiding a craft to intercept, capture, and track a radio beam, comprising radio means for providing signals corresponding to the displacement of the craft from the beam, a limiter receiving the displacement signals and limiting the amplitude of the signals and having means for changing its limiting amplitude, direction responsive means for providing signals corresponding to the heading of the craft relative to the direction of the beam, ratio changing means for changing the ratio of the displacement and heading signals relative to one another, a softener circuit for avoiding transients connected to the ratio changing means and operable when the ratio of the displacement and heading signals is changed, means connected to the softener circuit and responsive to the signals for guiding the craft, means for compensating for wind forces on the craft comprising a signal correcting circuit for providing corrective signals to the guiding means, relay means operable when the displacement signals attain a predetermined amplitude substantially greater than zero for operating the limited amplitude changing means of the limiter, for operating the ratio changer to change the ratio of the displacement and heading signals, for operating the softener circuit, and for connecting the heading corrector to the guiding means.

5. A navigation system for guiding a craft to intercept and track a radio beam, comprising radio means for providing signals corresponding to the displacement of the craft from the beam, a limiter receiving the displacement signals and limiting the amplitude of the signals and having means for changing its limiting amplitude, a data smoother connected to the limiter and responsive to the limited displacement signals and having means for changing its time constant, direction responsive means for providing signals corresponding to the heading of the craft relative to the direction of the beam, ratio changing means for changing the ratio of the displacement and heading signals relative to one another, a softener circuit for avoiding transients connected to the ratio changing means and operable when the ratio of the displacement and heading signals is changed, means connected to the softener circuit and responsive to the signals for guiding the craft, means for compensating for wind forces on the craft comprising a signal correcting circuit for providing corrective signals to the guiding means, first relay means operable when the displacement signal attains a predetermined amplitude substantially greater than zero for changing the limiting amplitude of the limiter, for operating the ratio changer to change the ratio of the displacement and heading signals, for operating the softener circuit, and for connecting the heading corrector to the guiding means, and second relay means connected to the first relay means and operable when the displacement signal attains a second predetermined amplitude for changing the time constant of the data smoother.

6. A navigation system for guiding a craft to intercept, capture, and track a radio beam, comprising radio means for providing signals corresponding to the displacement of the craft from the beam, direction responsive means for providing signals corresponding to the heading of the craft relative to the direction of the beam, means for combining the signals at one fixed ratio while the craft intercepts the beam, means responsive to the signals for guiding the craft, means for changing the ratio of the displacement and heading signals relative to one another, and means for sensing the amplitude of the displacement signals and operating said ratio changing means when the displacement signal amplitude drops to a predetermined value substantially greater than zero irrespective of the heading of the craft to change the ratio of the displacement and heading signals to a second fixed ratio to capture and track the beam.

7. A navigation system for guiding a craft to intercept, capture and track a radio beam, comprising radio means for providing signals corresponding to the displacement of the craft from the beam, direction responsive means for providing signals corresponding to the heading of the craft relative to the direction of the beam, means for combining the signals at one fixed ratio while the craft intercepts the beam, means responsive to the signals for guiding the craft, and means responsive to the displacement signals for changing the ratio of the displacement and heading signals relative to one another when the displacement signals attain a predetermined amplitude substantially greater than zero irrespective of the heading of the craft to change the ratio of the displacement and heading signals to a second fixed ratio to capture and track the beam.

8. A navigation system for guiding a craft to intercept, capture, and track a radio beam, comprising radio means for providing signals corresponding to the displacement of the craft from the beam, direction responsive means providing signals corresponding to the heading of the craft relative to the direction of the beam, means for combining the signals at one fixed ratio while the craft intercepts the beam, means responsive to the signals for guiding the craft, a speed sensor for providing signals corresponding to the speed of the craft, means for changing the ratio of the displacement and heading signals relative to one another, and means responsive to the displacement signals and to the speed signals for operating the ratio changing means to change the ratio of the displacement and heading signals to a second fixed ratio to capture and track the beam.

9. A navigation system for guiding a craft to intercept, capture and track a radio beam, comprising radio means for providing signals corresponding to the displacement of the craft from the beam, direction responsive means providing signals corresponding to the heading of the craft relative to the direction of the beam, means for combining the signals at one fixed ratio while the craft intercepts the beam, means responsive to the signals for guiding the craft, a speed sensor for providing signals corresponding to the speed of the craft, means for changing the ratio of the displacement and heading signals relative to one another, and means responsive to the displacement signals and to the speed signals for operating the ratio changing means when the sum of the displacement and speed signals drops to a predetermined amplitude substantially greater than zero to change the ratio of the displacement and heading signals to a second fixed ratio to capture and track the beam.

10. A navigation system for guiding a craft to intercept and track a radio beam, comprising radio means for providing signals corresponding to the displacement of the craft from the beam, direction response means providing signals corresponding to the heading of the craft relative to the direction of the beam, means for combining the signals at one fixed ratio while the craft intercepts the beam, means responsive to the signals for guiding the craft, means for providing signals corresponding to the rate of displacement of the craft from the beam, means for changing the ratio of the displacement and heading signals relative to one another, and means responsive to the displacement signals and to the beam rate signals for operating the ratio changing means when the sum of the displacement signals and beam rate signals drops to a predetermined amplitude substantially greater than zero irrespective of the heading of the craft to change the ratio of the displacement and heading signals to a second fixed ratio to capture and track the beam.

11. A navigation system for guiding a craft to intercept, capture, and track a radio beam from a transmitter, comprising radio means for providing signals corresponding to the displacement of the craft from the beam, direction responsive means for providing signals corresponding to the heading of the craft relative to the direction of the beam, means for combining the signals at one fixed ratio while the craft intercepts the beam, means responsive to the signals for guiding the craft, means for providing signals corresponding to the distance of the craft from the transmitter, means for changing the ratio of the displacement and heading signals relative to one another, and means responsive to the displacement signals and to distance signals for operating the ratio changing means to change the ratio of the displacement and heading signals to a second fixed ratio to capture and track the beam.

12. A navigation system for guiding a craft to intercept, capture, and track a radio beam from a transmitter, comprising radio means for providing signals corresponding to the displacement of the craft from the beam, direction responsive means for providing signals corresponding to the heading of the craft relative to the direction of the beam, means for combining the signals at one fixed ratio while the craft intercepts the beam, means responsive to the signals for guiding the craft, means for providing signals corresponding to the distance of the craft from the transmitter, means for changing the ratio of the displacement and heading signals relative to one another, and means responsive to the displacement signals and to distance signals for operating the ratio changing means when the sum of the displacement and distance signals drop to a predetermined amplitude substantially greater than zero to change the ratio of the displacement and heading signals to a second fixed ratio to capture and track the beam.

13. A navigation system for guiding a craft to intercept, capture, and track a radio beam, comprising radio means for providing signals corresponding to the displacement of the craft from the beam, direction responsive means for providing signals corresponding to the heading of the craft relative to the direction of the beam, means for combining the signals at one fixed ratio while the craft intercepts the beam, means responsive to the signals for guiding the craft, switching means operable when the displacement signals attain a predetermined value substantially greater than zero irrespective of the heading of the craft, and means operable by the switching means for changing the ratio of the displacement and heading signals relative to one another to a second fixed ratio to capture and track the beam.

14. A navigation system for guiding a craft to intercept, capture, and track a radio beam, comprising radio means for providing signals corresponding to the displacement of the craft from the beam, direction responsive means for providing signals corresponding to the heading of the craft relative to the direction of the beam, means for combining the signals at one fixed ratio while the craft intercepts the beam, means responsive to the signals for guiding the craft, and means responsive to the displacement signals for reducing the amplitude of the displacement signals relative to the heading signals when the displacement signal amplitude drops to a predetermined value substantially greater than zero irrespective of the heading of the craft to change the ratio of the displacement and heading signals to a second fixed ratio to capture and track the beam.

15. A navigation system for guiding a craft to intercept, capture, and track a radio beam, comprising radio means for providing signals corresponding to the displacement of the craft from the beam, direction responsive means for providing signals corresponding to the heading of the craft relative to the direction of the beam, means for combining the signals at one fixed ratio while the craft intercepts the beam, means responsive to the signals for guiding the craft, and means responsive to the displacement signals for increasing the amplitude of the heading signals relative to the displacement signals when the displacement signal amplitude drops to a predetermined value substantially greater than zero irrespective of the heading of the craft to change the ratio of the displacement and heading signals to a second fixed ratio to capture and track the beam.

16. A navigation system for guiding a craft to intercept, capture, and track a radio beam, comprising radio means for providing signals corresponding to the displacement of the craft from the beam, direction responsive means for providing signals corresponding to the heading of the craft relative to the direction of the beam, means for combining the signals at one fixed ratio while the craft intercepts the beam, means responsive to the signals for guiding the craft, and means responsive to the displacement signals for reducing the amplitude of the displacement signals relative to the heading signals and for increasing the amplitude of the heading signals relative to the displacement signals when the displacement signal amplitude drops to a predetermined value substantially greater than zero irrespective of the heading of the craft to change the ratio of the displacement and heading signals to a second fixed ratio to capture and track the beam.

17. A navigation system for guiding a craft to intercept, capture, and track a radio beam, comprising radio means for providing signals corresponding to the displacement of the craft from the beam, direction responsive means for providing signals corresponding to the heading of the craft relative to the direction of the beam, means responsive to the signals for guiding the craft, and means for compensating for wind forces on the craft comprising a signal correcting circuit receiving one of the signals and providing corrective signals to the guiding means, and means responsive to the displacement signals for rendering the signal correcting circuit operable when the displacement signals decrease to a predetermined amplitude substantially greater than zero irrespective of the heading of the craft.

18. A navigation system for guiding a craft to intercept, capture, and track a radio beam, comprising radio means for providing signals corresponding to the displacement of the craft from the beam, direction responsive means for providing signals corresponding to the heading of the craft relative to the direction of the beam, means responsive to the signals for guiding the craft, and a washout circuit receiving the heading signal and operating said guiding means to compensate for wind forces on the craft, and means responsive to the displacement signals for rendering the washout circuit operable when the displacement signals decrease to a predetermined amplitude substantially greater than zero irrespective of the heading of the craft.

19. A navigation system for guiding a craft to intercept, capture, and track a radio beam, comprising radio means for providing signals corresponding to the displacement of the craft from the beam, direction responsive means for providing signals corresponding to the heading of the craft relative to the direction of the beam, means responsive to the signals for guiding the craft, and integrating means for integrating the displacement signal and operating said guiding means to compensate for wind forces on the craft, and means responsive to the displacement signals for rendering the integrating means operable when the displacement signals decrease to a predetermined amplitude substantially greater than zero irrespective of the heading of the craft.

20. A navigation system for guiding a craft to intercept, capture, and track a radio beam, comprising radio means for providing signals corresponding to the displacement of the craft from the beam, direction responsive means for providing signals corresponding to the heading of the craft relative to the direction of the beam, means responsive to the signals for guiding the craft, and means for compensating for wind forces on the craft comprising a signal correcting circuit actuated by Doppler Radar signals and providing corrective signals to the guiding means, and means responsive to the displacement signals for rendering the signal correcting circuit operable when the displacement signals decrease to a predetermined amplitude substantially greater than zero irrespective of the heading of the craft.

21. A navigation system for guiding a craft to intercept, capture, and track a radio beam, comprising radio means for providing signals corresponding to the displacement of the craft from the beam, direction responsive means for providing signals corresponding to the heading of the craft relative to the direction of the beam, means for compensating for wind forces on the craft comprising a signal correcting circuit receiving one of the signals and providing corrective signals corresponding to the wind forces, means responsive to the signals for guiding the craft, means for changing the ratio of the radio and heading signals relative to one another, and means responsive to the displacement signals for operating the ratio changing means and the heading corrector when the displacement signals drop to a predetermined amplitude substantially greater than zero irrespective of the heading of the craft.

22. A navigation system for guiding a craft to intercept, capture, and track a radio beam, comprising radio means for providing signals corresponding to the displacement of the craft from the beam, a limiter receiving the displacement signals and limiting the amplitude of the signals, means controlled by the displacement signals for changing the limiting amplitude of the limiter when the displacement signals attain a predetermined amplitude substantially greater than zero irrespective of the heading of the craft, direction responsive means for providing signals corresponding to the heading of the craft relative to the direction of the beam, means for combining the signals at one fixed ratio while the craft intercepts the beam, means responsive to the heading and limited displacement signals for guiding the craft, and means controlled by the displacement signals for changing the ratio of the displacement and heading signals to a second fixed ratio relative to one another when the displacement signals attain the predetermined amplitude to capture and track the beam.

23. A navigation system for guiding a craft to intercept, capture and track a radio beam, comprising radio means for providing signals corresponding to the displacement of the craft from the beam, direction responsive means for providing signals corresponding to the heading of the craft relative to the direction of the beam, means for combining the signals at one fixed ratio while the craft intercepts the beam, means responsive to the displacement signals for changing the ratio of the signals relative to one another to a second fixed ratio when the displacement signals attain a predetermined amplitude substantially greater than zero to capture and track the beam, a softener circuit for avoiding transients receiving the signals and operable when the ratio of the displacement and heading signals is changed, and means connected to the softener circuit and responsive to the signals for guiding the craft.

24. A navigation system for guiding a craft to intercept, capture, and track a radio beam, comprising radio means for providing signals corresponding to the displacement of the craft from the beam, a limiter receiving the displacement signals and limiting the amplitude of the signals, means for changing the limiting amplitude of the limiter when the displacement signals attain a predetermined amplitude substantially greater than zero, direction responsive means for providing signals corresponding to the heading of the craft relative to the direction of the beam, means for combining the signals at one fixed ratio while the craft intercepts the beam, means responsive to the displacement signals and connected to the limiter and to the direction responsive means for changing the ratio of the signals to a second fixed ratio relative to one another when the displacement signals attain the predetermined amplitude to capture and track the beam, a softener circuit for avoiding transients connected to the ratio changing means and operable when the ratio of the displacement and heading signals is changed, and means connected to the softener circuit and responsive to the signals for guiding the craft.

25. A navigation system for guiding a craft to intercept, capture, and track a radio beam, comprising radio means for providing signals corresponding to the displacement of the craft from the beam, direction responsive means for providing signals corresponding to the heading of the craft relative to the direction of the beam, means responsive to the signals for guiding the craft, ratio changing means for combining the displacement and heading signals in one fixed ratio when the craft intercepts the beam and in another fixed ratio when the craft captures and tracks the beam, and means for sensing the amplitude of the displacement signals and operating the ratio changing means when the displacement signal amplitude decreases to a predetermined value substantially greater than zero irrespective of the heading of the craft.

26. A method of guiding a craft to intercept, capture, and track a radio beam, comprising flying the craft while intercepting the beam along a course determined by comparing the displacement of the craft from the beam to the heading of the craft relative to the direction of the beam in one fixed ratio, changing the one fixed ratio to a second fixed ratio when the displacement of the craft from the beam attains a predetermined value substantially greater than zero irrespective of the heading of the craft, and then flying the craft while capturing and tracking the beam along a course determined by comparing the displacement of the craft from the beam to the heading of the craft relative to the direction of the beam in the second fixed ratio.

27. A method of guiding a craft to intercept, capture, and track a radio beam, comprising flying the craft while intercepting the beam along a course determined by comparing the displacement of the craft from the beam to the heading of the craft relative to the direction of the beam in one fixed ratio, changing the one fixed ratio to a second fixed ratio of less value than the first fixed ratio when the displacement of the craft from the beam attains a predetermined value substantially greater than zero irrespective of the heading of the craft, and then flying the craft while capturing and tracking the beam along a course determined by comparing the displacement of the craft from the beam to the heading of the craft relative to the direction of the beam in the second fixed ratio.

28. A method of guiding a craft to intercept, capture, and track a radio beam, comprising flying the craft while intercepting the beam along a course determined by comparing the displacement of the craft from the beam to the heading of the craft relative to the direction of the beam in one fixed ratio, changing the one fixed ratio to a second fixed ratio by reducing the amplitude of the displacement relative to the heading when the displacement of the craft from the beam attains a predetermined value substantially greater than zero irrespective of the heading of the craft, and then flying the craft while capturing and tracking the beam along a course determined by comparing the displacement of the craft from the beam to the heading of the craft relative to the direction of the beam in the second fixed ratio.

29. A method of guiding a craft to intercept, capture, and track a radio beam, comprising flying the craft while intercepting the beam along a course determined by comparing the displacement of the craft from the beam to the heading of the craft relative to the direction of the beam in one fixed ratio, changing the one fixed ratio to a second fixed ratio by increasing the amplitude of the heading relative to the displacement when the displacement of the craft from the beam attains a predetermined value substantially greater than zero irrespective of the heading of the craft, and then flying the craft while capturing and tracking the beam along a course determined by comparing the displacement of the craft from the beam to the heading of the craft relative to the direction of the beam in the second fixed ratio.

30. A method of guiding a craft to intercept, capture, and track a radio beam, comprising flying the craft while intercepting the beam along a course determined by comparing the displacement of the craft from the beam to the heading of the craft relative to the direction of the beam in one fixed ratio, changing the one fixed ratio to a second fixed ratio by reducing the amplitude of the displacement relative to the heading and by increasing the amplitude of the heading relative to the displacement when the displacement of the craft from the beam attains a predetermined value substantially greater than zero irrespective of the heading of the craft, and then flying the craft while capturing and tracking the beam along a course determined by comparing the displacement of the craft from the beam to the heading of the craft relative to the direction of the beam in the second fixed ratio.

References Cited in the file of this patent

UNITED STATES PATENTS

| | | |
|---|---|---|
| 1,958,258 | Alexanderson | May 8, 1934 |
| 2,482,809 | Thompson | Sept. 27, 1949 |
| 2,613,350 | Kellogg | Oct. 7, 1952 |
| 2,613,352 | Kellogg | Oct. 7, 1952 |
| 2,776,428 | Hassler et al. | Jan. 1, 1957 |
| 2,801,059 | Hecht et al. | July 30, 1957 |
| 2,845,623 | Iddings | July 29, 1958 |
| 2,881,990 | Kutzler | Apr. 14, 1959 |
| 2,932,023 | Haskins | Apr. 5, 1960 |

FOREIGN PATENTS

| | | |
|---|---|---|
| 516,567 | Great Britain | Jan. 5, 1940 |
| 626,124 | Great Britain | July 11, 1949 |